US011247287B2

(12) United States Patent
Hutchison et al.

(10) Patent No.: US 11,247,287 B2
(45) Date of Patent: Feb. 15, 2022

(54) SYSTEMS AND METHODS FOR BUFFER SENSING IN A CONTROLLED SHORT CIRCUIT WELDING SYSTEM

(71) Applicant: Illinois Tool Works Inc., Glenview, IL (US)

(72) Inventors: Richard Martin Hutchison, Iola, WI (US); Todd Gerald Batzler, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 95 days.

(21) Appl. No.: 15/974,121

(22) Filed: May 8, 2018

(65) Prior Publication Data

US 2019/0344370 A1    Nov. 14, 2019

(51) Int. Cl.
*B23K 9/12* (2006.01)
*B23K 13/08* (2006.01)
(Continued)

(52) U.S. Cl.
CPC ............ *B23K 9/091* (2013.01); *B23K 9/1043* (2013.01); *B23K 9/125* (2013.01)

(58) Field of Classification Search
CPC ...... B23K 9/10–1075; B23K 9/12–123; B23K 9/124–125; B23K 11/24–241;
(Continued)

(56) References Cited

U.S. PATENT DOCUMENTS

| 4,288,682 | A | * | 9/1981 | Toth | B23K 9/125 |
| | | | | | 219/137.71 |
| 6,335,511 | B1 | * | 1/2002 | Rothermel | B23K 9/091 |
| | | | | | 219/124.03 |

(Continued)

FOREIGN PATENT DOCUMENTS

| DE | 3827508 | 2/1990 |
| WO | 2004105990 | 12/2004 |

OTHER PUBLICATIONS

English translation of WO 2004105990 to Stumpfl, Christian (Year: 2004).*

(Continued)

*Primary Examiner* — Michael A Laflame, Jr.
(74) *Attorney, Agent, or Firm* — McAndrews, Held & Malloy, Ltd.

(57) ABSTRACT

Disclosed is a welding-type power source that includes a first wire feeder provides a wire to a workpiece. A first wire feeder motor of the wire feeder to move the wire from a wire storage device to the workpiece. A second wire feeder motor moves the wire to and away from the workpiece and superimposes movement of the wire onto the movement from the first wire feeder motor. A moveable buffer located between the first and second wire feeder motors, and configured to accommodate a change in length of the wire between the first and second wire feeder motors when the second wire feeder motor moves the wire away from the workpiece. A sensor senses movement or displacement of the moveable buffer, wherein a speed or direction of the first (Continued)

or second wire feeder motors is adjusted based on data from the sensor.

20 Claims, 3 Drawing Sheets

(51) Int. Cl.
*B23K 9/09* (2006.01)
*B23K 9/10* (2006.01)
(58) Field of Classification Search
CPC ............ B23K 11/36–362; B23K 13/08; B23K 37/0258
See application file for complete search history.

(56) References Cited

U.S. PATENT DOCUMENTS

| | | | |
|---|---|---|---|
| 6,963,048 B2 | 11/2005 | Huismann et al. | |
| 6,984,806 B2 | 1/2006 | Huismann et al. | |
| 7,102,099 B2 | 9/2006 | Huismann et al. | |
| 7,165,707 B2 | 1/2007 | Huismann et al. | |
| 8,129,660 B2 | 3/2012 | Schorghuber et al. | |
| 8,704,132 B2 | 4/2014 | Artelsmair et al. | |
| 2003/0052094 A1* | 3/2003 | Sorg | B23K 11/002 219/110 |
| 2006/0201923 A1* | 9/2006 | Hutchison | B23K 9/1336 219/137.71 |
| 2007/0102411 A1* | 5/2007 | Takano | B23K 9/0735 219/137.71 |
| 2007/0151964 A1 | 7/2007 | Artelsmair et al. | |
| 2008/0257874 A1 | 10/2008 | Kaufman et al. | |
| 2008/0314884 A1* | 12/2008 | Fujiwara | B23K 9/092 219/130.51 |
| 2014/0027429 A1* | 1/2014 | Chantry | B23K 9/124 219/137.7 |
| 2016/0288237 A1* | 10/2016 | Gelmetti | B23K 9/124 |

OTHER PUBLICATIONS

PCT, Notification of Transmittal of the International Search Report and the Written Opinion of the International Searching Authority, or the Declaration, Application No. PCT/US2019/024943, dated Jul. 31, 2019, 16 pages.

* cited by examiner

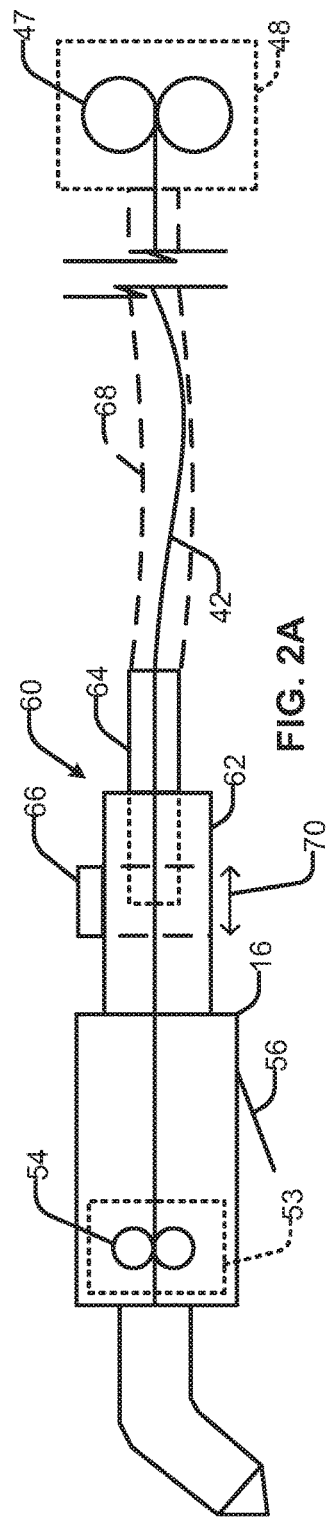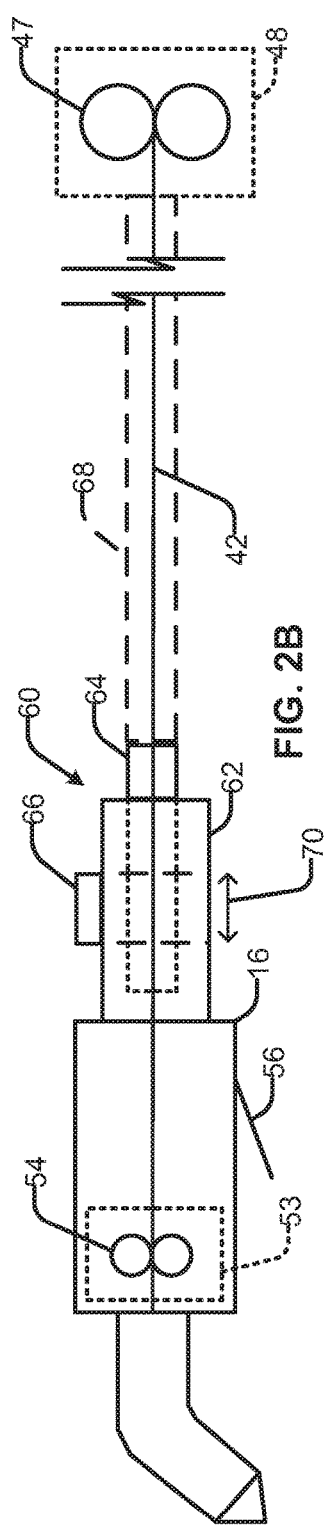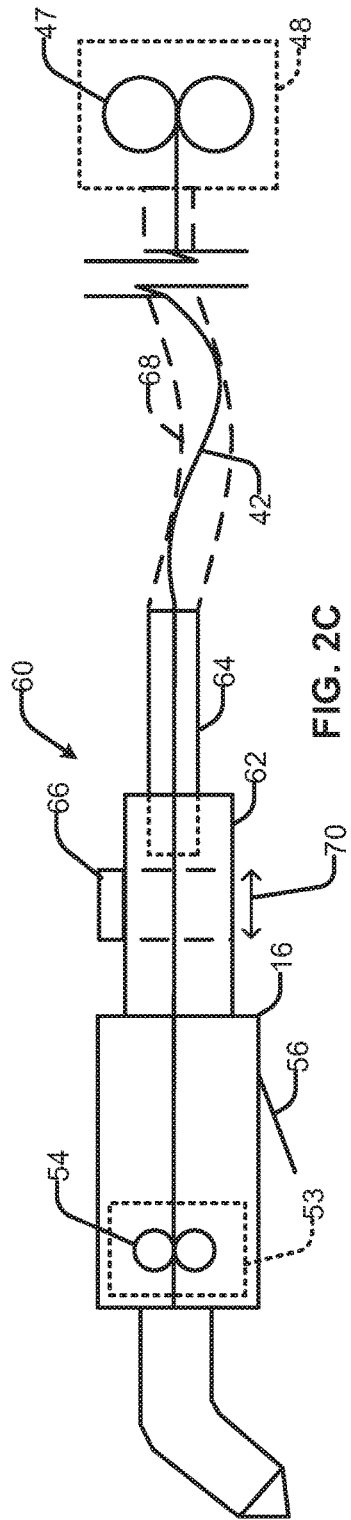

SYSTEMS AND METHODS FOR BUFFER SENSING IN A CONTROLLED SHORT CIRCUIT WELDING SYSTEM

BACKGROUND

In welding operations, gas metal arc welding (GMAW), and more specifically, metal inert gas (MIG) techniques allow for formation of a weld bead by feeding welding wire electrode shielded gas (typically an inert gas or gas containing inert agents) from a welding torch. Electrical power is applied to the welding wire and a circuit is completed through the workpiece to sustain an arc that melts the wire and the workpiece to form the desired weld.

Advanced forms of MIG welding are based upon generation of cyclic pulses that may cause controlled short circuits between the wire electrode and the advancing weld puddle comprising of melted metal of the workpieces and the wire electrode. Various pulsed regimes may be carried out in which current and/or voltage pulses are commanded by the power supply control circuitry to regulate the formation and deposition of metal droplets (and/or spray, and/or globules) from the welding wire, to sustain a desired heating and cooling profile of the weld puddle, to control short circuits between the wire and the weld puddle, and so forth.

In some systems, the wire is controlled to move to and from the workpiece to further control heat, deposition rate, or other characteristics of the welding operation. However, if too much or too little wire is advanced during the welding operation, the weld could be provided with too much or not enough wire to produce a quality weld. Thus, there is a need for improved welding components and techniques that allow for welding in pulsed and short circuit regimes while mitigating the impact of a reciprocating wire.

SUMMARY

The present disclosure relates generally to welding systems. More particularly, a welding system is configured to operate a controlled short circuit welding process, and includes a moveable buffer to account for a change in an amount of wire between a first wire feed motor and a second wire feed motor. A sensor senses movement and/or displacement of the moveable buffer, and provides sensor data to a control circuit to adjust a speed and/or a direction of the first wire feeder motor and/or the second wire feeder motor based on the data.

In disclosed examples, a welding-type power source includes a first wire feeder to provide a wire to a workpiece, the wire feeder comprising a first wire feeder motor for moving the wire from a wire storage device to the workpiece. A second wire feeder motor configured to move the wire to and away from the workpiece and to superimpose movement of the wire onto the movement from the first wire feeder motor. A moveable buffer located between the first wire feeder motor and the second wire feeder motor, the moveable buffer configured to accommodate a change in length of the wire between the first and second wire feeder motors when the second wire feeder motor moves the wire away from the workpiece. And a sensor to sense movement or displacement of the moveable buffer, wherein a speed or direction of the first wire feeder motor or the second wire feeder motor is adjusted based on data from the sensor.

In some examples, the moveable buffer comprises a first portion and a second portion, the first portion or the second portion configured to move relative to the other portion. In examples, one of the first portion or the second portion comprises the sensor, and one of the first portion or second portion comprises a target to provide an indication of movement to the sensor.

In some examples, the sensor comprises an optical detector configured to detect a change in an optical signal corresponding to relative movement between the first portion and the second portion. In examples, the sensor comprises a magnetic detector configured to detect a change in a magnetic field corresponding to relative movement between the first portion and the second portion. In some examples, the sensor comprises a linear variable differential transformer (LVDT) configured to detect linear displacement between the first portion and the second portion.

In examples, data from the sensor is provided to a control circuit, the control circuit configured to determine a position of the first portion relative to the second portion; and to control a speed of the first wire feeder or the second wire feeder based on the position.

In some examples, the control circuit is further configured to compare the position to one or more predetermined threshold values.

In examples, the control circuit is further configured to control the first wire feeder motor or the second wire feeder motor to adjust a wire feed direction to or away from the workpiece based on the comparison. In some examples, a position of one of the first portion or the second portion is fixed relative to a welding-type torch.

In examples, data from the sensor is provided to a control circuit, the control circuit configured to determine an amount of change in position or displacement of the wire within the moveable buffer; and control the first wire feeder to adjust speed to increase or decrease the length of the wire in the moveable buffer.

In some examples, the sensor is mounted within a housing of the wire feeder containing the first wire feeder motor.

In examples, data from the sensor is provided to a control circuit, the control circuit configured to adjust a power output from a power source in response to the sensor data. In some examples, the moveable buffer channels the wire to a robotic arm comprising a welding-type torch.

In disclosed examples, a welding-type power source includes a wire feeder to provide a wire to a workpiece, the wire feeder including a wire storage device and a first wire feeder motor for moving the wire to the workpiece from the wire storage device. A second wire feeder motor configured to move the wire to and away from the workpiece and to superimpose movement of the wire onto the movement from the first wire feeder motor. A moveable buffer located between the first wire feeder motor and the second wire feeder motor, the moveable buffer configured to accommodate an increase in length of the wire between the first wire feeder motor and the second wire feeder motor when the second wire feeder motor moves the wire away from the workpiece. A control circuit monitors an operational parameter of one of the first wire feeder motor or the second wire feeder motor, determines a tension or a compression on the wire within the moveable buffer based on the operational parameter, and adjusts a speed or direction of the first wire feeder motor or the second wire feeder motor based on data from the sensor.

In some examples, the operational parameter corresponds to one or more of current, voltage, power, inductance, speed, acceleration, motor angle, torque, or position. In examples, the control circuit is further configured to control a speed or direction of one of the first wire feeder motor or the second wire feeder motor based on the determined movement or displacement of the wire within the moveable buffer.

In some examples, the control circuit is further configured to control a wire spool motor to increase speed in response to the tension exceeding a first threshold value and to decrease speed in response to the compression exceeding a second threshold value.

In examples, a sensor senses the tension or compression on the wire at the wire spool motor, wherein data from the sensor is provided to the control circuit to control the wire spool motor.

In disclosed examples, a welding-type power source includes a welding-type power supply to output welding power for a welding-type torch. A wire feeder to provide a wire to a workpiece via the torch, the wire feeder includes a wire storage device and a first wire feeder motor for moving the wire to the workpiece from the wire storage device. A second wire feeder motor configured to move the wire to and away from the workpiece and to superimpose movement of the wire onto the movement from the first wire feeder motor. A moveable buffer located between the first wire feeder motor and the second wire feeder motor, the moveable buffer configured to accommodate an increase in length of the wire between the first wire feeder motor and the second wire feeder motor when the second wire feeder motor moves the wire away from the workpiece. A control circuit monitors an operational parameter of one of the first wire feeder motor or the second wire feeder motor, determines a tension or a compression on the wire within the moveable buffer based on the operational parameter, and adjusts a characteristic of the welding power based on the operational parameters.

DRAWINGS

FIGS. 2A through 2C illustrate an example operation of a moveable buffer, in accordance with aspects of this disclosure.

The figures are not necessarily to scale. Where appropriate, similar or identical reference numbers are used to refer to similar or identical components.

DETAILED DESCRIPTION

Figure 1:
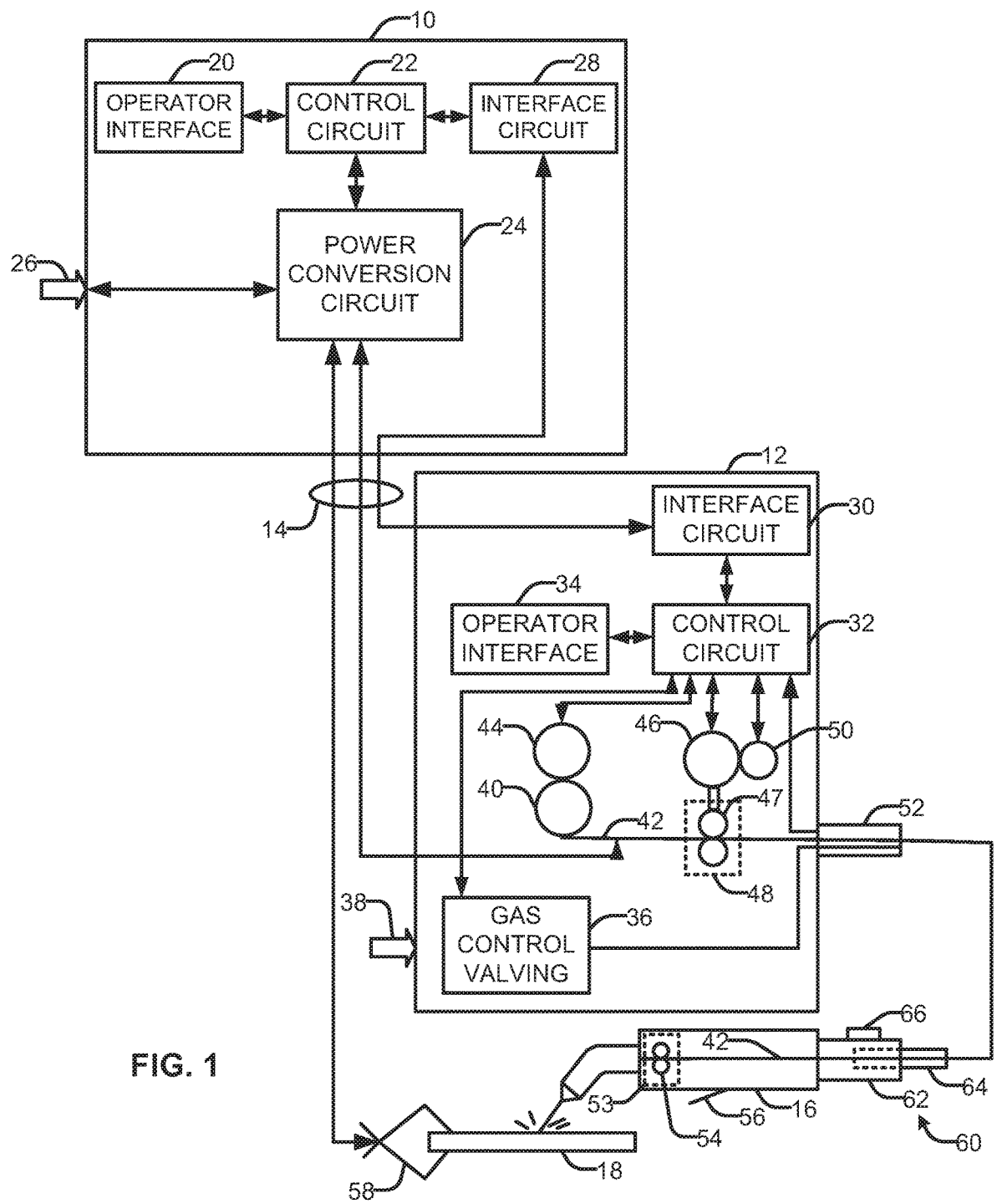
FIG. 1 illustrates an example arc welding system employing a moveable buffer, in accordance with aspects of this disclosure.

The present disclosure describes systems and methods for controlling one or more wire feeder motors during a controlled short circuit welding process in response to sensor data. As described more completely with respect to the several figures, a moveable buffer including a first and second portion is monitored by a sensor to sense an indication of a change in an amount of wire between the first and second wire feeder motors, such that the wire position and speed can be adjusted in accordance with a control scheme implemented by the control circuit.

For example, a short circuit cycle welding process operates by alternating between a short circuit event and an arc event. For instance, the arc event can be adjusted to control the short circuit clearance occurrence. In an example, it is desirable for the molten droplet from the welding wire to enter the weld puddle at a relatively low current level during a MIG welding process. If the current level is too high, the normal "wetting" action between the droplet and the puddle is interrupted by a high Lorentz "pinch" force at the droplet/puddle interface. This interruption of the droplet transfer process can result in large spatter droplets being expelled by the process.

To avoid such unnecessary splatter, phases of the arc event are set such that a predetermined current level is reached prior to the short circuit event. In particular, the phases of the arc event have the same independently adjustable parameters as described with respect to the short circuit phases. For example, the current levels can be reduced much more quickly during the arc phases, as higher voltage is available during the arc phases to drive energy from the output inductor.

To provide additional control to the CSC process, one or more reciprocating wire feeder motors can be employed to advance and/or retract the wire to ensure a desired weld speed, deposition rate, temperature, etc. One challenge associated with controlled short circuit (CSC) welding arises as the wire is being retracted. For example, the welding wire is being fed toward the workpiece by a first wire feeder motor, and has momentum in that direction. By definition, the second, or reciprocating, wire feeder motor moves the wire in the opposite direction (often in a cyclical fashion based on the short circuit cycle). If measures are not taken to compensate for the opposing forces, the wire might not feed in a smooth and efficient manner, damaging both the weld and possibly the welding system. Accordingly, a CSC or pulse welder that compensates for the reversal of the wire is desirable.

As described more completely with respect to the several figures, a moveable buffer including a first and second portion is monitored by a sensor to sense an indication of a change in an amount of wire between the first and second wire feeder motors, such that the wire position and speed can be adjusted in accordance with a control scheme implemented by the control circuit.

In an example, a first wire feed motor is mounted near the source of wire, such as a spool or reel of wire that drives the wire to the torch. As the second (reversible/reciprocating) wire feeder motor(s) retract the wire, while the first wire feeder motor continues to feed the wire, the moveable buffer is provided to account for the increase in wire between the first wire feed motor and the second wire feed motor. Similarly, when the second wire feed motor advances the wire, wire is withdrawn from the moveable buffer.

The second wire feeder motor moves the end of the wire in addition to the movement from the first wire feeder motor, or superimposes motion onto motion imposed by the first wire feeder motor. The speed of the first wire feeder motor is coordinated with the average speed of the second wire feeder motor, so that, on average, they both drive the same length of wire.

However, during a welding process, the speed of the first and the second wire feeder motors may fall out of sync, and/or the moveable buffer may become "stuffed" or "starved" with wire. In order to control the amount and speed of the wire to the workpiece, a sensor is provided to monitor the effects of the wire within the moveable buffer and provide data to a control circuit to adjust a parameter of the welding system to accommodate the change experienced by the buffer. For example, if the sensor data indicates an excess amount of wire, the first and/or second wire feeder motors are used to slow or stop the wire. On the other hand, if the sensor data indicates that too little wire is being advanced, the first wire feeder motor may increase wire feed speed to provide wire at an increased rate.

Although sensors may be provided that sense the amount of wire in the buffer, additionally or alternatively, the welding system parameters may be monitored and applied to algorithms or circuitry designed to correlate parameters (e.g., current, voltage, power, inductance, wire feed speed, wire feed acceleration, wire feeder motor angle, torque, position, etc.) to a tension or compression of the wire. If a control circuit determines that the tension or compression of the wire exceeds a threshold amount, the welding system may adjust one or more outputs to correct the imbalance. In an example, an operational parameter of the first and/or second wire feeder motor may be adjusted (e.g., wire feed speed or direction) in response.

In another example, a power output characteristic of the welding power supply may be adjusted (e.g., current, voltage, power, phase, etc.) to change an amount of wire being consumed during the welding process (e.g., increase or decrease the weld deposition rate).

The moveable buffer may be any mechanism or technique that stores and returns the extra wire, or provides an increased wire path length between the wire source and the torch (e.g., between a first and a second wire feeder motor). The moveable buffer may include a wire liner about the wire for at least a portion of the distance from the source to the torch. The liner may be disposed in a tube that is wider, and the liner can bend and flex within the tube, thus increasing the length of wire in a given length of tube. The tube can be mounted to a hollow shaft, and the wire passes through the shaft, which can be fixed in one position. Thus, as the wire is advanced or retracted, the wire moves relative to the tube and shaft, or the tube and shaft may move relative to the wire. Alternatively, the liner may be mounted to the shaft, and the wire moves relative to the liner. The liner may be compressible, such as a coil spring, so that as the wire retracts, the spring compresses.

Employing the systems and methods describe herein serve to increase arc welding process stability, and decrease spatter generation during welding. The resulting process is more responsive to dynamically changing process variables, such as contact tip to work distance (CTWD), welding torch travel speed, welding torch angle, workpiece material thickness, joint configuration, among other variables.

As used herein, the term "buffer", as used herein, includes components used to take up the wire when the wire direction is reversed and provide wire when the wire is advanced.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit" includes any analog and/or digital components, power and/or control elements, such as a microprocessor, digital signal processor (DSP), software, and the like, discrete and/or integrated components, or portions and/or combinations thereof.

As used herein, the term "pulsed welding" or "pulsed MIG welding" refers to techniques in which a pulsed power waveform is generated, such as to control deposition of droplets of metal into the progressing weld puddle.

As used herein, the term "boost converter" is a converter used in a circuit that boosts a voltage. For example, a boost converter can be a type of step-up converter, such as a DC-to-DC power converter that steps up voltage while stepping down current from its input (e.g., from the starter battery) to its output (e.g., a load and/or attached power bus). It is a type of switched mode power supply.

As used herein, the term "buck converter" (e.g., a step-down converter) refers to a power converter which steps down voltage (e.g., while stepping up current) from its input to its output.

As used herein, the term "memory" includes volatile and non-volatile memory, and can be arrays, databases, lists, etc.

As used herein, the term "torch" or "welding-type tool" can include a hand-held or robotic welding torch, gun, or other device used to create the welding arc.

FIG. 1 illustrates an example arc welding system for performing controlled short circuit (CSC) welding operations employing a moveable buffer 60. In this example, the moveable buffer 60 includes a first portion 62 and a second portion 64, where at least one of the first and second portions are configured to move relative the other portion in response to a change in the amount of wire 42 between a first wire feeder motor 46 and a second wire feeder motor 53. A sensor 66 (e.g., one or more sensors) is configured to sense relative movement or displacement between the first and second portions and provide sensor data to control circuit (e.g., control circuit 22, 32) to adjust a speed and/or direction of the wire 42 in response.

As shown in the arc welding system of FIG. 1, a power supply 10 and a wire feeder 12 are coupled via conductors or conduits 14. In the illustrated example, the power supply 10 is separate from the wire feeder 12, such that the wire feeder may be positioned at some distance from the power supply near a welding location. However, in some examples the wire feeder may be integrated with the power supply 10. In such cases, the conduits 14 would be internal to the system. In examples in which the wire feeder 12 is separate from the power supply 10, terminals are typically provided on the power supply and on the wire feeder 12 to allow the conductors or conduits to be coupled to the systems so as to allow for power and gas to be provided to the wire feeder 12 from the power supply 10, and to allow data to be exchanged between the two devices.

The system is configured to provide wire, power and shielding gas to a welding torch 16. The welding torch may be of many different types, and may allow for the feed of a welding wire and gas to a location adjacent to a workpiece 18 where a weld is to be formed to join two or more pieces of metal. A second conductor is run to the welding workpiece so as to complete an electrical circuit between the power supply and the workpiece.

The welding system is configured for data settings to be selected by the operator, particularly via an operator interface 20 provided on the power supply. The operator interface will typically be incorporated into a front faceplate of the power supply, and may allow for selection of settings such as the weld process, the type of wire to be used, voltage and current settings, and so forth. In particular, the system is configured to allow for MIG welding with various steels, aluminums, or other welding wire that is channeled through the torch. These weld settings are communicated to control circuit 22 within the power supply. The system may be particularly adapted to implement welding regimes configured for certain electrode types. Additionally or alternatively, process instructions can be provided via a weld sequence program, such as stored on a memory accessible to a processor/control circuit associated with the power supply. In such a case, the sequencer can be predetermined (e.g., associated with a desired product configuration and/or product), and/or customizable by a user and/or by parsing historical data.

The control circuit 22, described in greater detail below, operates to control generation of welding power output that is applied to the welding wire for carrying out the desired welding operation. In examples, the control circuit may be adapted to regulate a pulsed MIG welding regime that promotes short circuit transfer of molten metal to a progressing weld puddle without adding excessive energy to the weld or electrode. In "short circuit" modes, droplets of molten material form on the welding wire under the influence of heating by the welding arc, and these are periodically transferred to the weld puddle by contact or short circuits between the wire and droplets and the weld puddle.

The present arc welding system allows for control of successive voltage and/or current levels and/or pulse durations based on previous current and duration measurements so as to control the promotion, occurrence, duration, and interruption of short circuit events between the welding wire electrode and the advancing weld puddle. In particular, current peaks in waveforms are regulated based on one or more preceding short circuit events, or aspects of the short circuit events, such as its duration.

The control circuit is coupled to power conversion circuit 24. This power conversion circuit is adapted to create the output power, such as pulsed waveforms applied to the welding wire at the torch. Various power conversion circuits may be employed, including choppers, boost circuitry, buck circuitry, inverters, converters, and so forth. The configuration of such circuitry may be of types generally known in the art in and of itself. The power conversion circuit 24 is coupled to a source of electrical power as indicated by arrow 26. The power applied to the power conversion circuit 24 may originate in the power grid, although other sources of power may also be used, such as power generated by an engine-driven generator, batteries, fuel cells or other alternative sources. The power supply illustrated in FIG. 1 may also include an interface circuit 28 configured to allow the control circuit 22 to exchange signals with the wire feeder 12.

The wire feeder 12 includes a complimentary interface circuit 30 that is coupled to the interface circuit 28. In some examples, multi-pin interfaces may be provided on both components and a multi-conductor cable run between the interface circuit to allow for such information as wire feed speeds, processes, selected currents, voltages or power levels, and so forth to be set on either the power supply 10, the wire feeder 12, or both.

The wire feeder 12 also includes control circuit 32 coupled to the interface circuit 30. As described below, the control circuit 32 allows for wire feed speeds to be controlled in accordance with operator selections or stored sequence instructions, and permits these settings to be fed back to the power supply via the interface circuit. The control circuit 32 is coupled to an operator interface 34 on the wire feeder that allows selection of one or more welding parameters, particularly wire feed speed. The operator interface may also allow for selection of such weld parameters as the process, the type of wire utilized, current, voltage or power settings, and so forth. The control circuit 32 may also be coupled to gas control valving 36 which regulates the flow of shielding gas to the torch. In general, such gas is provided at the time of welding, and may be turned on immediately preceding the weld and for a short time following the weld. The gas applied to the gas control valving 36 may be provided in the form of pressurized bottles, as represented by reference numeral 38.

The wire feeder 12 includes components for feeding wire to the welding torch and thereby to the welding application, under the control of control circuit 32. For example, one or more spools of welding wire 40 are housed in the wire feeder. Welding wire 42 is unspooled from the spools and is progressively fed to the torch. The spool may be associated with a clutch 44 that disengages the spool when wire is to be fed to the torch. The clutch may also be regulated to maintain a minimum friction level to avoid free spinning of the spool. The first wire feeder motor 46 is provided within a housing 48 that engages with wire feed rollers 47 to push wire from the wire feeder towards the torch.

In some examples, the sensor 66, or an additional or alternative sensor, can be located at the housing 48 to gauge the speed of the wire 42 as it exists the wire feeder 12. In examples, the sensor(s) can measure other operational parameters associated with operation of the wire feeder 12 (e.g., current, voltage, inductance, phase, power, inductance, speed, acceleration, motor angle, torque, position, etc.).

In practice, at least one of the rollers 47 is mechanically coupled to the motor and is rotated by the motor to drive the wire from the wire feeder, while the mating roller is biased towards the wire to maintain good contact between the two rollers and the wire. Some systems may include multiple rollers of this type. A tachometer 50 or other sensor may be provided for detecting the speed of the first wire feeder motor 46, the rollers 47, or any other associated component so as to provide an indication of the actual wire feed speed. Signals from the tachometer are fed back to the control circuit 32, such as for continued or periodic monitoring, calibration, etc. In some examples, the system includes a wire spool motor for rotating the wire feeding device, which can be similarly adjusted to increase or decrease the amount of wire between wire feeder motors.

Other system arrangements and input schemes may also be implemented. For example, the welding wire may be fed from a bulk storage container (e.g., a drum) or from one or more spools outside of the wire feeder. Similarly, the wire may be fed from a "spool gun," in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting.

Power from the power supply is applied to the wire electrode, typically by a welding cable 52. Similarly, shielding gas is fed through the wire feeder and the welding cable 52. During welding operations, the wire is advanced through the welding cable jacket towards the torch 16. Within the torch, a second wire feeder motor 53 comprises rollers 54 may be provided with an associated drive roller, which can be regulated to provide the desired wire feed speed and/or direction.

A trigger switch 56 on the torch provides a signal that is fed back to the wire feeder 12 and therefrom back to the power supply 10 to enable the welding process to be started and stopped by the operator (including a robotic operator). That is, upon depression of the trigger switch, gas flow may begin, wire may advance, and power may be applied to the welding cable 52 and through the torch 16 to the advancing welding wire 42. A workpiece cable and clamp 58 allow for closing an electrical circuit from the power supply through the welding torch, the electrode (wire), and the workpiece for maintaining the welding arc during operation.

In pulsed welding regimes, the wire feed speed may be altered periodically or cyclically. Although the wire feed speed may be "set" by the operator and/or weld sequence, the speed of one or both of the first or second wire feeder motors may fall out of sync during a welding operation. The result may be an excess or dearth of welding wire at the workpiece and/or between the first or second wire feeder motors. The sensor 66 is configured to sense movement or displacement between the first portion 62 and the second portion 64 of the moveable buffer 60.

In other words, the moveable buffer 60 provides an indication of the amount of wire the between the first and second wire feeder motors by gauging relative movement between the first portion 62 and the second portion 64 of the moveable buffer 60. For example, the first portion 62 may be fixed relative to the torch 16, whereas the second portion 64 may be configured to move in response to a change in the amount of wire 42 between the first and second wire feeder motors. The first and second portions may have a desired relative position (i.e. a neutral position), such that the second portion may move toward or away from the torch by a threshold amount without meeting the physical limits of the moveable buffer 60 (i e making contact with an end of the first portion 62). Thus, an amount of slack is present in the wire 42 between the first and second wire feeder motors.

During operation, the sensor 66 is configured to sense the movement of the second portion 64 relative to the first portion 62. Data regarding the movement/displacement is provided to one or both of control circuits 22, 32. If, based on the data, the control circuits determines that the second portion 62 has deviated from the neutral position beyond an acceptable threshold amount, the control circuitry is configured to control the speed and/or direction of the first and/or second wire feeder motors to mitigate the change and return the moveable buffer 60 to the desired neutral position. The particular threshold amounts, as well as the amount of speed and/or change in direction implemented in response, can be predetermined by a welding sequence particular to a welding operation, can be based on trend data analyzed during the welding operation, based on networked information from similar welding systems, input by an operator, determined by algorithms to control the CSC process, etc.

FIGS. 2A through 2C illustrate the example moveable buffer 60 during a CSC welding operation. FIG. 2A illustrates a moveable buffer 60 where the second portion 64 is within a threshold length 70 within the first portion 62. In other words, the wire 42 being fed to the torch 16 is neither too far advanced nor too far retracted relative to the first and second wire feeder motors. This balanced position can be achieved by a calibration procedure, as well as effective remediation steps performed in response to change in position and/or displacement of the second portion 64 within the moveable buffer 60, as described herein.

Additionally or alternatively, the wire 42 can travel between wire feeder motors encased within the wire liner 68 (e.g., a monocoil). Wire liner 68 may comprise a coil spring that allows for compression and expansion to further buffer the wire. Storing a length of wire 42 within the liner 68 includes taking up wire when the wire direction is reversed. Wire liner, as used herein, includes a tube in which the wire 42 can easily move during a welding operation.

In examples, the sensor 66 is configured to sense the amount of wire taken up by moveable buffer 60. Examples of such sensors include a wheel with an encoder that is turned as the wire moves past it, an optical sensor, or a linear transformer, with the liner being comprised of a ferrite or magnetic material. The control circuit may include a buffer feedback input that receives the feedback, and provides a control signal for one or more of the first and/or second wire feeder motors that is responsive to the buffer feedback.

As shown, FIG. 2B illustrates a decrease in an amount of wire 42 between the first and second wire feeders, whereas FIG. 2C illustrates an increase in the amount of wire 42. In the example of FIG. 2B, the first portion 62 is fixed to the torch 16 and the second portion 64 is configured to move relative to the first portion 62. As shown in FIG. 2B, the wire liner 68 is taut, as the slack has been removed from the wire 42 due to the tension caused by too little wire between the wire feeder motors (i.e. the system is "starved" of wire). However, the wire liner 68 is configured to flex and bend in response to changes in the amount of wire 42 between the wire feeder motors. In some examples, the wire liner 68 is coupled to the moveable buffer 60 at the second portion 64, such that the wire liner 68 and the second portion 64 move in concert. The wire liner 68 can be coupled to the wire feeder housing 48 at the entrance point for the wire 42.

FIG. 2C illustrates an increase in the amount of the wire 42 between the first and second wire feeder motors (i.e. the system is "stuffed" with wire). As shown, the wire 42 is compressed such that excess wire 42 presses against the wire liner 68, causing both to flex from a normal wire pathway. This compressive force pulls the second portion 64 away the torch 16 as the wire liner 68 flexes, to the opposite side of the threshold distance 70 outside a neutral position (e.g., shown in FIG. 2A).

The sensor 66 is configured to sense the relative movement between the first and second portions. The sensor 66 can achieve accurate sensing by a variety of sensing technologies, including optical, magnetic, mechanical, etc. In this example, the sensor may sense that the second portion 64 has been displaced relative to the first portion 62, indicating a change in the amount of wire 42 in the moveable buffer 60. Sensor data is provided to the control circuit 22 of FIG. 1, which is configured to determine the amount of movement and/or displacement of the second portion 64. If a determination is made that the movement and/or displacement is outside the allowable threshold 70, the control circuity 22 controls the first wire feeder motor 46 and/or the second wire feeder 53 to speed up, stop, and/or adjust direction to return the second portion 64 to a neutral position. For example, the first wire feeder motor 46 may increase speed, whereas the second wire feeder motor 53 may decrease speed to increase the amount of wire between the two wire feeder motors.

The sensor 66 can be an optical detector configured to detect a change in an optical signal (e.g., infrared, laser, visible light, etc.) corresponding to relative movement between the first portion and the second portion. For example, the sensor can transmit an optical signal which can be returned via a reflector or reflective surface of the second portion 64. Advantageously, optical sensors can have a small size, are cost effective, are simple to operate, and are robust.

In examples, the sensor 66 is a magnetic detector, configured to detect a change in a magnetic field corresponding to relative movement between the first portion and the second portion. In an example, the sensor 66 is a linear variable differential transformer (LVDT) for measuring linear displacement between the first and second portions of the moveable buffer 60. Magnetic detectors, such as LVDTs, are frictionless, thus are designed to consume very little power and to operate for long periods of time even under constant use. In some examples, a mechanical sensor is used, such as a rotating tachometer.

The sensor(s) 66 are configured to sense a position or linear displacement from a reference point (e.g., a neutral position within the threshold 70) into an electrical signal. The signal contains data, which can be binary (i.e. the second portion 64 is present or absent), or contain information regarding direction or speed of the relative movement. Although shown directly coupled to the torch 16, the sensor 66 can be located at any position along the wire path between the first and second wire feeder motors, such as where a liner may connect to the wire feeder 12. Moreover, the torch 16 can include a power pin coupling to connect the torch and the sensor 66.

In any event, employing sensor data and/or indirect analysis of operational parameters to determine a change in the wire, the response to the change in the amount of wire between the two wire feeder motors can be coordinated with the application of the CSC welding sequence to provide a consistent, quality weld.

Figure 3:
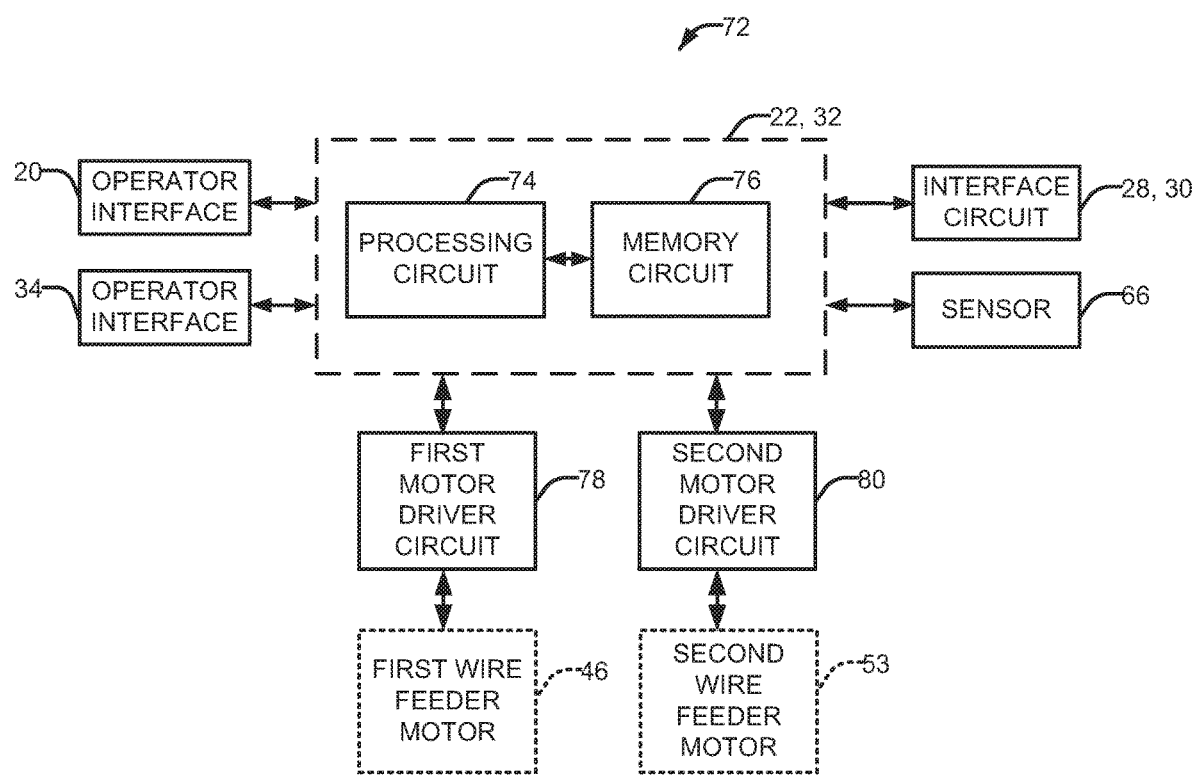
FIG. 3 is a graphical representation of example control circuit components for a welding power supply of the type shown in FIG. 1, in accordance with aspects of this disclosure.

FIG. 3 illustrates example control circuit, such as one or both of control circuits 22, 32, configured to function in a system of the type illustrated in FIGS. 1 and 2. The overall circuitry, designated here by reference numeral 72, may include the operator interfaces 20 and 34 and interface circuits 28 and 30. For example, the various interfaces can provide communication of operational parameters, including user input and networked information, as well as information from downstream components such as a wirefeeder, a welding torch, and various sensors and/or actuators. In particular, sensor 66 is in communication with the control circuit, such that information regarding changes detected in the moveable buffer 60 are provided to the control circuit.

The circuitry includes a processing circuit 74 which itself may include one or more application-specific or general purpose processors, configured to make determinations regarding the amount of wire between the first and second wire feeder motors, or the state of the moveable buffer generally. The processing circuit 74 may be further configured to carry out welding regimes, make computations for waveforms implemented in welding regimes, and other functions associated with a welding type system. The processing circuit 74 is configured to control a number of systems, including a first motor driver circuit 78 and a second motor driver circuit 80. The processing circuit provides control signals to the first and second motor driver circuits to adjust a speed and/or direction of the first wire feeder motor 46 and/or the second wire feeder motor 53 in response to information corresponding to an amount of wire between the two wire feeder motors. In particular, the sensor 66 can monitor a relative movement between the first portion and second portion of the moveable buffer 60, and provide data to the processing circuit 74 for analysis and determination.

Additionally or alternatively, one or more of the interfaces (e.g., interface circuits 28, 30; operator interfaces 20, 34) can provide information corresponding to operational parameters of the system. In this example, operational parameter information can be provided by one or more of the wire feeder motors, such as current draw, voltage, power, inductance, wire feed speed, wire feed acceleration, wire feeder motor angle, torque, position, etc., which can be analyzed by the processing circuit 74 to indirectly determine an amount of wire between the wire feeder motors (e.g., compression or tension on the wire). This process can be implemented in conjunction with a sensor 66 or without to achieve a similar result. In some examples, the processing circuit 74 includes a timer, a speed sensor, a length sensor, or other sensor that may provide information to inform determinations on the amount of wire between wire feeder motors.

Additionally or alternatively, the control circuit can be configured to monitor and/or adjust a power output characteristic (e.g., current, voltage, power, phase, etc.) associated with the power supply. For instance, if the moveable buffer indicates too much wire is between the first and second wire feeder motors (e.g., via sensor 66, from monitoring operational parameters, etc.), the current applied to the wire electrode can be increased to increase wire deposition rate. Conversely, if the moveable buffer indicates too little wire is between the first and second wire feeder motors, the current can be decreased, thereby decreasing the wire deposition rate. In this manner, the change in output will change the amount of wire being consumed during the welding process, thereby facilitating a return of the moveable buffer to within the threshold amount 70.

In some examples, the wire feed speed at the first wire feeder motor can be fixed, such that adjustments are made to the either the second wire feeder motor (e.g., wire feed speed, wire direction), and/or operating parameters of the power supply (e.g., current, voltage, etc.). Advantageously, the first wire feeder can avoid complex control of the wire feeder motor, which should extend the life of the motor.

The processing circuit 74 will also be associated with memory circuitry 76 which may consist of one or more types of permanent and temporary data storage, such as for providing the welding regimes implemented, storing welding parameters, storing weld settings, storing error logs, etc. The adjustment of the wire direction and/or speed can be made by reference and/or comparison to historical data from preceding CSC operations, which can be stored on memory circuit 76. For instance, adjustment may be made on the basis of stored data based on an historical analysis of a similar welding operation. The historical data can correspond to, for example, operational parameters, other sensor data, a user input, as well as data related to trend analysis, threshold values, profiles associated with a particular mode of operation, etc., and can be stored in a comparison chart, list, library, etc., accessible to the processing circuit 74.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

The invention claimed is:

1. A welding-type power source, comprising:
    a first wire feeder to provide a wire to a workpiece, the wire feeder comprising a first wire feeder motor for moving the wire from a wire storage device to the workpiece;
    a second wire feeder motor configured to move the wire to and away from the workpiece and to superimpose movement of the wire onto the movement from the first wire feeder motor;
    a moveable buffer located between the first wire feeder motor and the second wire feeder motor, the moveable buffer comprising a first portion and a second portion, the first portion or the second portion configured to move relative to the other portion, the first and second portions configured to accommodate a change in length of the wire between the first and second wire feeder motors when the second wire feeder motor moves the wire away from the workpiece, wherein the first and second portions are arranged to overlap at a neutral position between the first and second wire feeder motors;
    a sensor to sense movement or displacement of the first portion of the moveable buffer relative to the second portion of the moveable buffer; and
    a controller to:
        determine whether the movement or displacement has caused the first portion or the second portion to move from the neutral position based on data from the sensor;
        determine whether the movement or displacement results in compression or tension of the wire; and
        adjust a direction of the first wire feeder motor or the second wire feeder motor based on the data from the sensor to move the first portion or the second portion of the moveable buffer to the neutral position between the first wire feeder motor and the second wire feeder motor.

2. The welding-type power source of claim 1, wherein one of the first portion or the second portion comprises the sensor, and one of the first portion or second portion comprises a target to provide an indication of movement to the sensor.

3. The welding-type power source of claim 2, wherein the sensor comprises an optical detector configured to detect a change in an optical signal corresponding to relative movement between the first portion and the second portion.

4. The welding-type power source of claim 2, wherein the sensor comprises a magnetic detector configured to detect a change in a magnetic field corresponding to relative movement between the first portion and the second portion.

5. The welding-type power source of claim 2, wherein the sensor comprises a linear variable differential transformer (LVDT) configured to detect linear displacement between the first portion and the second portion.

6. The welding-type power source of claim 1, wherein data from the sensor is provided to a control circuit, the control circuit configured to:
    determine a position of the first portion relative to the second portion; and
    control a speed of the first wire feeder or the second wire feeder based on the position.

7. The welding-type power source of claim 6, wherein the control circuit is further configured to;
    compare one or more of the position, the movement, or the displacement to one or more predetermined threshold values; and
    control the adjustment based the position, movement, or displacement exceeding a corresponding threshold value.

8. The welding-type power source of claim 7, wherein the control circuit is further configured to control the first wire feeder motor or the second wire feeder motor to adjust a wire feed direction to or away from the workpiece based on the comparison.

9. The welding-type power source of claim 1, wherein a position of one of the first portion or the second portion is fixed relative to a welding-type torch.

10. The welding-type power source of claim 1, wherein data from the sensor is provided to a control circuit, the control circuit configured to:
    determine an amount of change in position or displacement of the wire within the moveable buffer; and
    control the first wire feeder to adjust speed to increase or decrease the length of the wire in the moveable buffer.

11. The welding-type power source of claim 1, wherein the sensor is mounted within a housing of the wire feeder containing the first wire feeder motor.

12. The welding-type power source of claim 1, wherein data from the sensor is provided to a control circuit, the control circuit configured to adjust a power output from a power source in response to the sensor data.

13. The welding-type power source of claim 1, wherein the moveable buffer channels the wire to a robotic arm comprising a welding-type torch.

14. A welding-type power source, comprising:
    a wire feeder to provide a wire to a workpiece, the wire feeder comprising:
        a wire storage device; and
        a first wire feeder motor for moving the wire to the workpiece from the wire storage device;
    a second wire feeder motor configured to move the wire to and away from the workpiece and to superimpose movement of the wire onto the movement from the first wire feeder motor;
    a moveable buffer located between the first wire feeder motor and the second wire feeder motor, the moveable buffer comprising a first portion and a second portion, the first portion or the second portion configured to move relative to the other portion, the first and second portions configured to accommodate an increase in length of the wire between the first wire feeder motor and the second wire feeder motor when the second wire feeder motor moves the wire away from the workpiece, wherein the first and second portions are arranged to overlap at a predetermined position between the first and second wire feeder motors; and a control circuit configured to:
monitor an operational parameter of one of the first wire feeder motor or the second wire feeder motor;
determine a tension or a compression on the wire corresponding to a length of the wire within the moveable buffer based on the operational parameter; and
adjust a speed and a direction of the first wire feeder motor or the second wire feeder motor based on data from the sensor to move the first portion or the second portion of the moveable buffer to the predetermined position between the first wire feeder motor and the second wire feeder motor.

15. The welding-type power source of claim 14, wherein the operational parameter corresponds to one or more of current, voltage, power, inductance, speed, acceleration, motor angle, torque, or position.

16. The welding-type power source of claim 14, wherein the control circuit is further configured to control a speed or direction of one of the first wire feeder motor or the second wire feeder motor based on the determined movement or displacement of the wire within the moveable buffer.

17. The welding-type power source of claim 14, wherein the control circuit is further configured to control a wire spool motor to increase speed in response to the tension exceeding a first threshold value and to decrease speed in response to the compression exceeding a second threshold value.

18. The welding-type power source of claim 14, further comprising a sensor to sense the tension or compression on the wire at the wire spool motor, wherein data from the sensor is provided to the control circuit to control the wire spool motor.

19. A welding-type power source, comprising:
a welding-type power supply to output welding power for a welding-type torch;
a wire feeder to provide a wire to a workpiece via the torch, the wire feeder comprising:
a wire storage device; and
a first wire feeder motor for moving the wire to the workpiece from the wire storage device;
a second wire feeder motor configured to move the wire to and away from the workpiece and to superimpose movement of the wire onto the movement from the first wire feeder motor;
a moveable buffer located between the first wire feeder motor and the second wire feeder motor, the moveable buffer comprising a first portion and a second portion, the first portion or the second portion configured to move relative to the other portion, the first and second portions configured to accommodate an increase in length of the wire between the first wire feeder motor and the second wire feeder motor when the second wire feeder motor moves the wire away from the workpiece, wherein the first and second portions are arranged to overlap at a neutral position between the first and second wire feeder motors; and
a control circuit configured to:
monitor an operational parameter of one of the first wire feeder motor or the second wire feeder motor;
determine a tension or a compression on the wire within the moveable buffer based on the operational parameter; and
adjust a characteristic of the welding power to change a wire deposition rate based on the operational parameters, wherein the characteristic comprises one or more of current, voltage, power, or phase.

20. The welding-type power source of claim 1, wherein the control circuit is further configured to:
adjust the direction of the first wire feeder motor or the second wire feeder motor in a first direction based on a determination that the movement or displacement results in compression of the wire; and
adjust the direction of the first wire feeder motor or the second wire feeder motor in a second direction opposite the first direction based on a determination that the movement or displacement results in tension of the wire.

* * * * *